United States Patent
Min et al.

(10) Patent No.: US 9,599,446 B2
(45) Date of Patent: Mar. 21, 2017

(54) SMALL SEALING GAUGE

(71) Applicant: Hyundai Motor Company, Seoul (KR)

(72) Inventors: Tae Il Min, Hwaseong-si (KR); Si Yoon Lee, Incheon (KR)

(73) Assignee: Hyundai Motor Company, Seoul (KR)

( * ) Notice: Subject to any disclaimer, the term of this patent is extended or adjusted under 35 U.S.C. 154(b) by 62 days.

(21) Appl. No.: 14/570,284

(22) Filed: Dec. 15, 2014

(65) Prior Publication Data

US 2016/0033253 A1 Feb. 4, 2016

(30) Foreign Application Priority Data

Jul. 30, 2014 (KR) ........................ 10-2014-0097353

(51) Int. Cl.
*G01B 3/22* (2006.01)
*G01B 5/14* (2006.01)

(52) U.S. Cl.
CPC ...................... *G01B 5/14* (2013.01)

(58) Field of Classification Search
CPC .................... G01B 5/14; G01B 3/22
USPC ............... 33/613, 645, 832, 833, 836
See application file for complete search history.

(56) References Cited

U.S. PATENT DOCUMENTS

| | | | | |
|---|---|---|---|---|
| 2,799,941 A * | 7/1957 | Emery | ...................... | G01B 3/22 33/559 |
| 4,554,747 A * | 11/1985 | Williams | ................ | G01B 5/213 33/536 |
| 5,077,909 A * | 1/1992 | Cranor | ...................... | F01L 1/46 33/607 |
| 6,412,187 B1 * | 7/2002 | Sasaki | .................... | G01B 3/004 33/542 |
| 8,286,362 B2 | 10/2012 | Petersheim | | |
| 2001/0009069 A1 * | 7/2001 | Ishii | ........................ | G01B 5/163 33/199 R |
| 2003/0126754 A1 * | 7/2003 | Berger | ..................... | G01B 5/24 33/506 |
| 2012/0084991 A1 * | 4/2012 | Ketelaar | ................. | G01B 3/22 33/549 |
| 2013/0067760 A1 * | 3/2013 | Husted | ..................... | G01B 3/24 33/784 |
| 2013/0232802 A1 * | 9/2013 | Hayashi | ................... | G01B 5/00 33/501 |
| 2014/0033554 A1 * | 2/2014 | Nahum | ............... | G06F 9/44505 33/784 |

FOREIGN PATENT DOCUMENTS

| | | |
|---|---|---|
| JP | 2003-254702 A | 9/2003 |
| JP | 2010-237054 A | 10/2010 |
| JP | 2014-35237 A | 2/2014 |
| KR | 1994-0003965 B1 | 5/1994 |
| KR | 10-2003-0000289 A | 1/2003 |
| KR | 2003-0089905 A | 11/2003 |
| KR | 10-2008-0045916 A | 5/2008 |

* cited by examiner

Primary Examiner — G. Bradley Bennett
(74) Attorney, Agent, or Firm — Morgan, Lewis & Bockius LLP

(57) ABSTRACT

A small sealing gauge may include a body that is attached to a site to be measured, a lever that linearly moves by contact with a moving part while moving in a state of being inserted into a hole of the body, and a dial gauge that is inserted to a back side of the hole in the body to measure an amount of movement of the lever through contact with the lever.

4 Claims, 5 Drawing Sheets

[ section A-A ]

SMALL SEALING GAUGE

CROSS-REFERENCE TO RELATED APPLICATION

The present application claims priority to Korean Patent Application No. 10-2014-0097353 filed Jul. 30, 2014, the entire contents of which is incorporated herein for all purposes by this reference.

BACKGROUND OF THE INVENTION

Field of the Invention

The present disclosure relates to a small sealing gauge. More particularly, it relates to a small sealing gauge capable of quickly, conveniently, and accurately measuring a sealing gap between a vehicle body and a door.

Description of Related Art

In general, only if gaps constituted for each part are formed at requested intervals in a vehicle body BIW or a complete vehicle, parts do not interfere with each other, and when an airtight material such as a buffer material and a weather strip is interposed in the gap, abnormality does not occur. Accordingly, measurement of a sealing gap for each part is a very important test item at stages of development and mass-production of new cars.

For example, the quality is secured by measuring the sealing gap between the BIW and doors and between the BIW and a tailgate/trunk at the stages of development and mass-production of new cars.

In the conventional sealing gap measurement method, if a sealing gap measuring device has not been included, an operator has directly measured the sealing gap using a gap ruler and a steel ruler, and in this case, reliability of the measurement result is reduced, and there are a lot of difficulties in measurement of the trunk section measurement.

That is, since the sealing gap is checked by putting the steel ruler or the gap ruler to a position to be directly measured by the operator and by visually reading the numerical values, there are disadvantages that measurement errors depending on the operator are excessive, thus, reliability of the measurement data declines, and the measurement is time-consuming.

Meanwhile, there is a method that measures the sealing gap using an expensive sealing gap measuring device, and in this case, the sealing gap is measured by sensing an amount of press of a strain gauge.

For example, the device is equipped with a sensor and a computer, and the sealing gap is measured using the amount of press sensing of the strain gauge attached to the sensor. However, in the method, there are disadvantages that the price of the device is high, thus, it is economically disadvantageous to purchase and use at each plant, and there is a limitation in measuring a curve section due to a sensor size.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a small sealing gauge that is constituted by combination of a measurement gauge mounted on a measurement site to be capable of measuring a sealing interval between two components through a linear motion, and a digital display capable of checking the measurement result by a dial gauge, and by which anyone can easily, quickly, and conveniently measure the sealing interval and can obtain the accurate measurement results.

According to various aspects of the present invention, a small sealing gauge may include a body that is attached to a site to be measured, a lever that linearly moves by contact with a moving part while moving in a state of being inserted into a hole of the body, and a dial gauge that is inserted to a back side of the hole in the body to measure an amount of movement of the lever through contact with the lever.

The body may have an "L" shape and a magnet may be mounted to an inner surface thereof.

The body may be provided with a ball plunger that is capable of adjusting lever fluidity while coming into contact with one side surface of the lever.

The body may be provided with a knob that fixes a lever position while coming into contact with another side surface of the lever.

The dial gauge may include an adapter that is closely coupled to a side of the body using at least two pins inserted into the pin hole in the body.

According to the small sealing gauge according to the present invention, it is possible to secure the reliability of measurement, anyone can conveniently use the gauge (measurement experts are not required), it is possible to shorten the measurement time (the measurement time can be reduced to two-thirds compared to a manual measurement), and it is possible to reduce the cost compared to the existing sealing measuring device on the assumption that one set is introduced into each domestic plant.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1A:
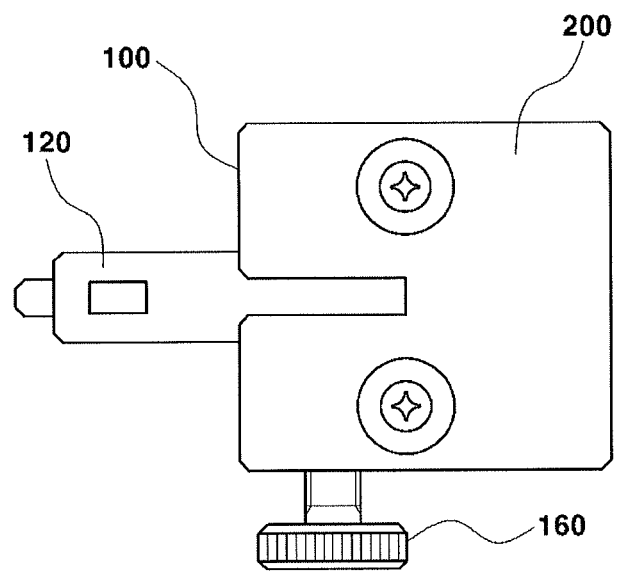
FIG. 1A, FIG. 1B, and FIG. 1C are a front view, a side view, and a plan view showing a body and a lever in an exemplary small sealing gauge according to the present invention.
Figure 1B:
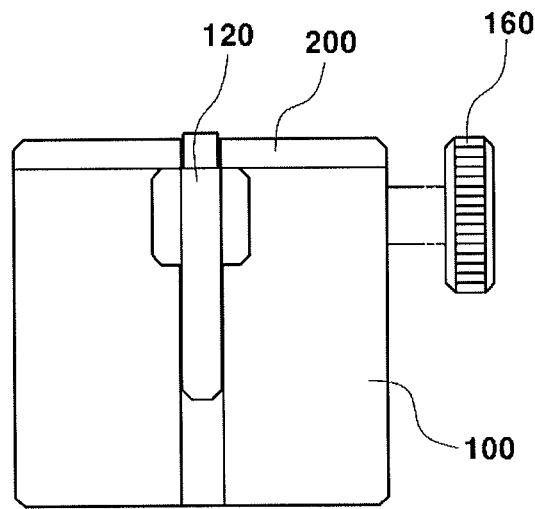
Figure 1C:
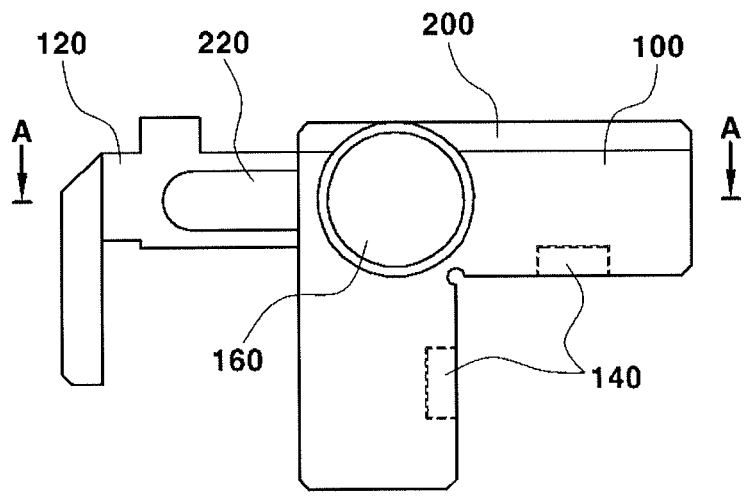
Figure 2:
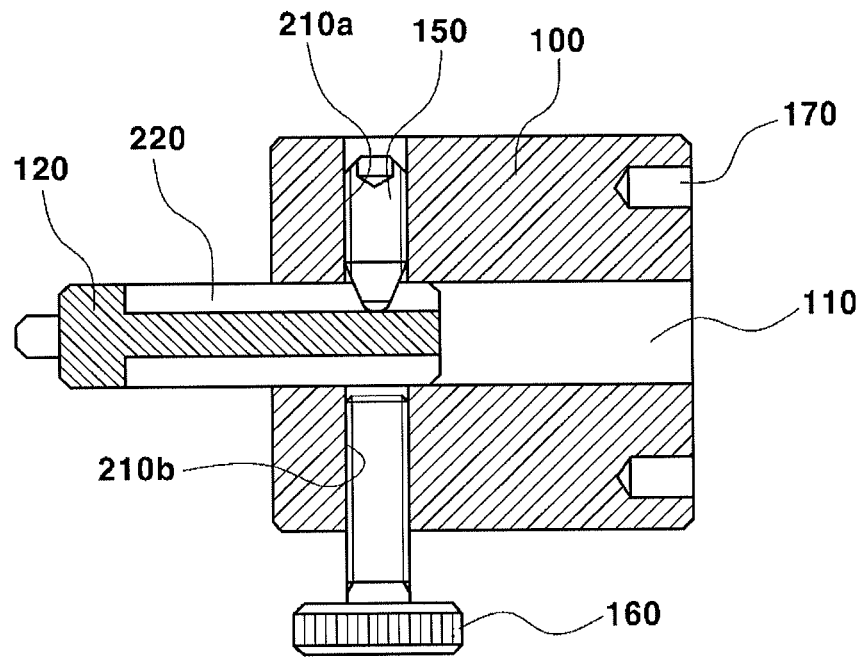
FIG. 2 is a cross-sectional view taken from a line A-A of FIG. 1C.
Figure 3A:
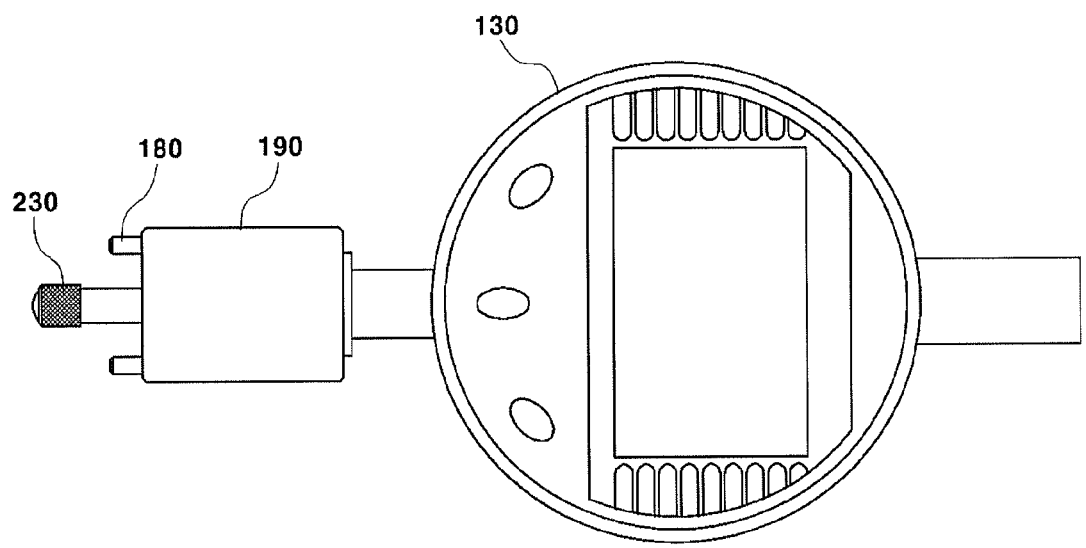
FIG. 3A and FIG. 3B are a front view and a plan view showing a dial gauge in the exemplary small sealing gauge according to the present invention.
Figure 3B:
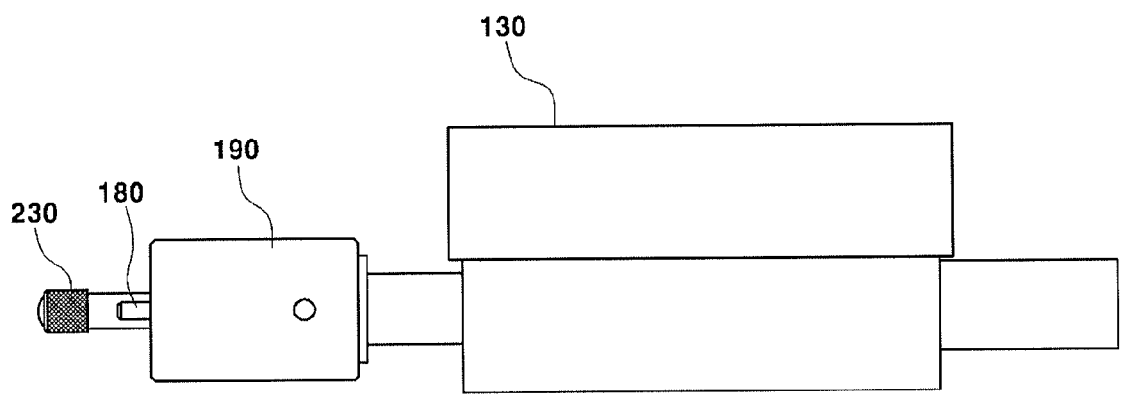

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

FIG. 1A, FIG. 1B, FIG. 1C, FIG. 2, FIG. 3A and FIG. 3B show the schematic structure of a small sealing gauge according to various embodiments of the present invention.

As shown in FIG. 1A, FIG. 1B, FIG. 1C, FIG. 2, FIG. 3A and FIG. 3B, the small sealing gauge according to the present invention includes a body 100 and a lever 120 as a measurement gauge, and a dial gauge 130 as a digital display.

The body 100 is attached to a panel site for measuring the sealing gap and consists of an "L" shaped block, parallel holes 110 are formed through a horizontal block along the longitudinal direction, and the lever 120 is installed thereon to be slidably and linearly movable.

At this time, the lever 120 is inserted from the front side when inserted into the hole 110 of the body 100.

Here, the hole 110 can be formed in such a way that grooves are machined on the horizontal block upper surface along the longitudinal direction side by side, and a cover 200 is fastened to the top of the horizontal block to finish the groove.

Moreover, in order to attach the body 100 to the panel part, a large number of magnets 140 are mounted on each inner surface of the horizontal block and the vertical block, and thus, the body 100 can be attached to the vehicle body side panel part using the magnetic force.

Also, on both sides of the body 100, two screw holes 210a and 210b facing each other are formed, and a ball plunger 150 and a knob 160 which will be described later are fastened to each of the screw holes 210a and 210b, respectively.

Also, on the back side of the body 100, i.e., on the back side of the horizontal block, pin holes 170 are formed at each of both positions of the hole 110, and two pins 180 located at an adapter 190 to be described later are coupled to the pin holes 170, while being inserted thereto.

The lever 120 is a part that substantially measures the sealing gap and comes into contact with a measured object, and linearly moves along the hole 110 by contact with the moving parts (a measured object), while moving in a state of being inserted into the hole 110 located at the body 100.

The lever 120 has an "L" shape in which a vertical member coming into contact with the moving parts and a horizontal member moving in the hole 110 are integrated to each other.

Moreover, on the side surface of the lever 120, i.e., on the side surface of the horizontal member, slots 220 are formed side by side along the longitudinal direction of the member, and as a leading end of the ball plunger 150 comes into contact with the wall surface of the slots 220, the fluidity of the lever 120 can be adjusted.

For example, the body 100 is provided with the ball plunger 150 which can adjust the lever fluidity while coming into contact with one side surface of the lever 120, and the ball plunger 150 is coupled to a screw hole 210a in the body 100 by a screwing structure and presses the wall surface of the slot 220 through the leading end portion thereof.

Thus, when adjusting the extent that presses the lever 120 by tightening or loosening the ball plunger 150, it is possible to adjust the strength of the lever fluidity, such as being able to smoothly or tightly move the lever 120.

Also, on the upper surface of the leading end portion of the lever 120, that is, the upper surface of the leading end portion of the horizontal member, a handle is formed to protrude therefrom, and the handle can be used when the operator pulls out the lever 120 by hand.

In particular, a knob 160 is provided as a means for securing the movement of the lever 120, and the knob 160 is mounted in a structure that is fastened to a screw hole 210b formed on the side surface of body 100, that is, the screw hole 210b formed on the opposite side of the screw hole 210a side by side to which the ball plunger 150 is coupled.

The knob 160 mounted in this way presses and fixes the lever 120, while coming into contact with the other side surface of the lever 120, that is, an opposite side surface of a side coming into contact with the ball plunger 150, through the leading end portion thereof.

That is, the knob 160 serves to fix the lever 120 so that the flow does not occur in the lever 120 during measurement after measurement of the sealing gap.

The dial gauge 130 is a means for displaying a sealing gap measurement value, i.e., a value obtained by measuring the movement distance of the lever 120, as a numerical value, and it is possible to apply a commonly used generic dial gauge.

Such a dial gauge 130 is inserted to the back of the hole 110 in the body 100 to display the values measured after measuring the amount of movement of the lever through the contact with the lever 120 as numerical values.

That is, the dial gauge 130 can be used in such a way that a measurement element 230 is pressed through the contact with the back end of the lever 120 and the numerical value as much as a pressed level is displayed as a digital scale.

In particular, the dial gauge 130 is a means for being coupled to the body 100 side and includes a block type adapter 190, and the adapter 190 is mounted to a stem portion of the dial gauge 130 without interference with the measurement element 230 in a structure that is fixed by a set screw or the like.

Moreover, on the front surface of the adapter 190, two pins 180 are formed to protrude from both sides, and each of the pins 180 is inserted into both pin holes 170 in the body 100.

Thus, the overall adapter 190 including the dial gauge 130 can come into close contact with the back surface of the body 100, while holding the position by unity between the pins 180 and the pin holes 170, and in addition to this, the measurement element 230 can enter the hole 110 of the body 100.

Figure 4A:
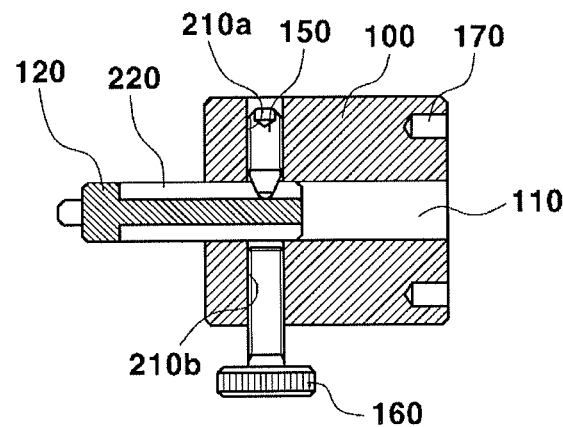
FIG. 4A, FIG. 4B, and FIG. 4C are front views showing a use state of the exemplary small sealing gauge according to the present invention.
Figure 4B:
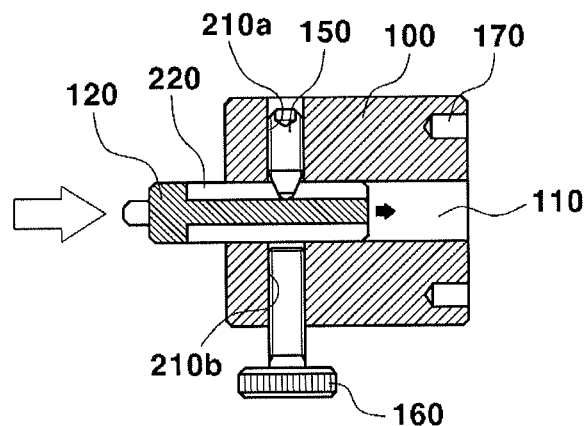
Figure 4C:
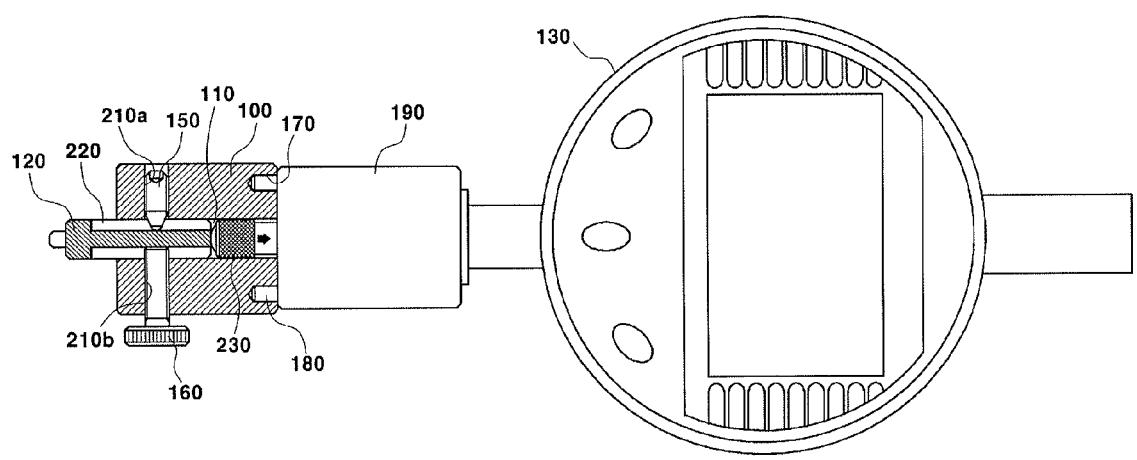

FIG. 4A, FIG. 4B, and FIG. 4C are front views showing a use state of the small sealing gauge according to various embodiments of the present invention.

As shown in FIG. 4A, FIG. 4B, and FIG. 4C, a sealing gap measurement method is based on a principle of measuring the sealing gap through the movement distance of the lever, when the moving part presses and then completely closes the lever while the moving part is closed, the lever is fixed in a state of being touched as much as the sealing interval, and the body and the dial gauge are coupled to each other via the adapter in this state to be able to check the sealing gap of the measurement site.

First, in a state of pulling the lever 120 in the body 100 forward as much as possible, the body 100 is attached to a site to be measured, for example, a vehicle body site coming into contact with the door, and a vehicle body site with which the tail gate or the trunk comes into contact, using a magnet 140.

Next, the moving parts such as the door and the tail gate are closed after attachment of the body 100.

At this time, the lever 120 moves rearward while coming into contact with the sealing surface of the moving parts.

That is, the lever 120 is caused to move backward along the hole 110 of the body 100 by being pushed by the moving parts.

Next, after opening the moving parts, the knob 160 is locked to fix the lever 120, and the body 100 is disconnected from the vehicle side.

Next, when the measurement element 230 of the dial gauge 130 enters the hole 110 to come into contact with the lever 120 while coupling the dial gauge 130 to the body 100 through the adapter 190, the measurement element 230 is pressed and the numerical values as much as the pressed level are displayed on the dial gauge 130, and thus, it is possible to measure the sealing gap corresponding to the movement distance of the lever 120.

Of course, it is possible to measure the sealing gap in such a way that, in a state of pulling the lever 120 forward as much as possible, the measurement element 230 of the dial gauge 130 comes into contact with the back end of the lever to set the scale to "0", and an amount of change in scale during measurement after moving the lever is read.

In this way, the small sealing gauge of the present invention is intended to improve the quality of the appearance and the function quality by the quick and accurate sealing gap measurement at the stage of the development and mass production of new cars, and can be used regardless of the BIW and the complete vehicle universal use and location, and provides an advantage of not requiring a measurement professional.

Also, since a cost reduction is achieved compared to the existing devices, it is possible to reduce the cost in assumption of introduction into the domestic plants.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A small sealing gauge comprising:
   a body configured to be attached to a site to be measured and having a hole;
   a lever inserted into the hole of the body and linearly movable in the hole by contact with a moving part to be measured while moving in a state of being inserted into the hole of the body; and
   a dial gauge configured to receive a measurement element entering the hole to come into contact with the lever while coupling the dial gauge to the body through an adapter such that the measurement element is pressed by movement distance of the lever in the hole and numerical values as much as pressed level are displayed on the dial gauge,
   wherein the body is provided with a ball plunger configured to adjust movability of the lever while the ball plunger comes into contact with one side surface of lever, and
   wherein the body is provided with a knob fixing a lever position while the knob comes into contact with another side surface of the lever at an opposite side surface of the one side surface coming into contact with the ball plunger, through a leading end portion of knob.

2. The small sealing gauge of claim 1, wherein the body has an "L" shape and a magnet is mounted to an inner surface thereof.

3. The small sealing gauge of claim 1, wherein the dial gauge includes the adapter that is closely coupled to a side of the body using at least two pins inserted into a pin hole in the body.

4. The small sealing gauge of claim 1, wherein the lever has an "L" shape in which a vertical member coming into contact with the moving part and a horizontal member moving in the hole are integrated to each other.

* * * * *